United States Patent
Spreen et al.

(10) Patent No.: US 10,779,481 B2
(45) Date of Patent: Sep. 22, 2020

(54) TREE CABLING SYSTEM FOR ROOF DECKS

(71) Applicant: The Shredded Tire, Inc., Fort Lauderdale, FL (US)

(72) Inventors: Richard P. Spreen, Fort Lauderdale, FL (US); Stephen W. Warter, Delray Beach, FL (US)

(73) Assignee: The Shredded Tire, Inc., Fort Lauderdale, FL (US)

( * ) Notice: Subject to any disclaimer, the term of this patent is extended or adjusted under 35 U.S.C. 154(b) by 233 days.

(21) Appl. No.: 15/997,086

(22) Filed: Jun. 4, 2018

(65) Prior Publication Data

US 2018/0343811 A1    Dec. 6, 2018

Related U.S. Application Data

(60) Provisional application No. 62/514,798, filed on Jun. 3, 2017.

(51) Int. Cl.
*A01G 17/12* (2006.01)

(52) U.S. Cl.
CPC .................... *A01G 17/12* (2013.01)

(58) Field of Classification Search
CPC ........ A01G 17/04; A01G 17/10; A01G 17/12; A01G 9/12
See application file for complete search history.

(56) References Cited

U.S. PATENT DOCUMENTS

| | | | | |
|---|---|---|---|---|
| 4,520,590 A | * | 6/1985 | Schuh | A01G 17/04 47/43 |
| 5,199,214 A | * | 4/1993 | Caldwell | A01G 17/04 135/118 |
| 5,363,591 A | * | 11/1994 | Jones | A47G 33/12 248/524 |
| 5,454,188 A | * | 10/1995 | Sofy | A47G 33/12 248/523 |
| 8,336,252 B1 | * | 12/2012 | Ammons | A01G 23/04 47/42 |
| 2017/0164566 A1 | * | 6/2017 | Stablum | A01G 9/02 |

* cited by examiner

*Primary Examiner* — Magdalena Topolski
*Assistant Examiner* — Arfan Y. Sinaki
(74) *Attorney, Agent, or Firm* — Nancy J. Flint, Attorney at Law, P.A.; Nancy J. Flint, Esq.

(57) ABSTRACT

A tree anchoring apparatus, a tree anchoring kit and a method of anchoring of a tree on a roof deck is provided consisting of three tree cabling systems attached to a tree. Each tree cabling system can exist in one of two states, depending on whether there is slack in the system or whether there is resistance due to movement of the tree from a vertical position to a horizontal position. In a wind event that causes the tree to move from a vertical position to a horizontal position, one or more of the tree cabling systems will experience resistance that keeps the tree in a horizontal position. When the wind event is over, the tree can be returned to a vertical position.

10 Claims, 6 Drawing Sheets

FIG. 2E ated approximately 120° apart
TREE CABLING SYSTEM FOR ROOF DECKS

FIELD OF THE INVENTION

The invention relates to a tree anchoring apparatus, a tree anchoring kit and a method of anchoring of a tree on a roof deck. According to the invention, three tree cabling systems are attached to a tree. Each tree cabling system can exist in one of two states, depending on whether there is slack in the system or whether there is resistance due to movement of the tree from a vertical position to a horizontal position. In a wind event that causes the tree to move from a vertical position to a horizontal position, one or more of the tree cabling systems will experience resistance that keeps the tree in a horizontal position. When the wind event is over, the tree can be returned to a vertical position.

BACKGROUND OF THE INVENTION

Tall structures have been in existence for centuries. The Great Pyramid of Giza, built in the 26th Century BC, was as high as 480 feet high. The Towers of Bologna, constructed in the 12th Century AD, topped out at about 320 feet for the tallest tower. Although these were tall structures, they did not perform the same functions that today's modern high-rise does. The purpose of the modern high-rise building is to maximize building area in the smallest lot area.

In high-rise buildings, residents desire to have a green common space available within the building. One available space that is often used as a green common space is the roof deck, or terrace. Elevated green common spaces can provide outdoor leisure and nice views for those who live in the high-rise building. Roof decks can be outfitted with swimming pools, grilling stations, dog runs, flat-screen televisions and landscaped walking paths.

Roof decks experience issues unique to their location. For example, atop a high-rise building, the wind can be much stronger than at ground level which can lead to furnishings becoming projectiles.

Roof decks are commonly planted with flowering shrubs, large shrubs, small trees and other plants. One issue that arises with planting large trees is the safety issue of anchoring of the trees on the roof deck. This is due in large part because roof decks have shallow soil in which to locate the root ball of the tree. As such the tree requires support in addition to that of the weight of the soil upon the root ball to prevent it from falling over, e.g. when subject to wind loading. The root ball cannot be anchored in a way that would penetrate the rooftop, since this comprises a water impermeable layer for protecting the inside of the building from water damage.

SUMMARY OF THE INVENTION

The Tree Cabling System (T.C.S.) of the invention provides resistance to prevent overturning of trees during a wind event additional to the resistance provided by the root system of trees planted on roof decks. When cable tension within the T.C.S. becomes high enough to cause slippage of clamps holding cables to the tree, the tree becomes horizontal. At that point, the moment which caused the overturning is greatly reduced and the T.C.S. holds the tree in place.

Three T.C.S.s (tree cabling systems) of the invention are used for each tree, each located approximately 120° apart from each other around the tree to be anchored. Each T.C.S. comprises a wire rope which is fastened to the tree trunk at one end and an anchor at the other end. The anchor is fastened to the concrete roof deck. Each T.C.S. further comprises a second 2" diameter horizontal steel cylinder attached at a 90° angle to the top of the anchor. The wire rope is wrapped around the horizontal cylinder. The first end of the wire rope is fastened around the trunk of a tree and closed with a plurality of clamps. The second end of the wire rope passes through the horizontal cylinder attached to the top of each anchor and then through a washer where it is secured with one or more clamps.

The wire rope is connected with an amount of slack such that in a wind event the tree to which it is connected can move from a vertical position to a horizontal position. When the tree is in the horizontal position, the wire rope is held in position by the washer as it meets the horizontal cylinder. The wire rope can be sized to allow some slack in the line when the tree is in the horizontal position to allow for movement during the wind event.

Each T.C.S. can exist in a "primary" state and a "secondary" state. The primary state exists when the wire rope remains slack and is not pulled through the horizontal cylinder, and there is slack in the wire rope. The secondary state exists when the wire rope experiences tension and is pulled through the horizontal cylinder such that the washer meets with the end of the horizontal cylinder.

The T.C.S.s continue to hold the tree when it lies in its horizontal position, as the wire rope surrounding the tree trunk tightens when the wire rope becomes taught. Some slack in the wire rope remains allowing minor movements of the tree during minor wind events. This slack in the wire rope also allows dirt packed around the roots of the tree to resist some force as it would if planted at ground level. As the tree grows, the wire rope can be adjusted for a larger circumference.

DETAILED DESCRIPTION OF THE INVENTION

The root system of trees planted on a roof deck provide wind resistance similar to a tree planted at ground level. The Tree Cabling System (T.C.S.) of the invention provides additional resistance to prevent overturning of trees planted on roof decks during a wind event. The T.C.S. accounts for a steady directional wind that applies overturning pressure on the tree. When cable tension within the T.C.S. becomes high enough to cause slippage of clamps holding cables to the tree, the tree becomes horizontal. At that point, the moment which caused the overturning is greatly reduced and the T.C.S. holds the tree in place.

Three T.C.S.s (tree cabling systems) of the invention are used for each tree, each located approximately 120° apart from each other around the tree to be anchored. Each T.C.S. comprises a wire rope which is fastened to the tree trunk at one end and an anchor at the other end. The anchor is fastened to the concrete roof deck, for example with 4 threaded rods secured by epoxy. The anchor comprises a vertical 4" diameter steel cylinder welded to a base. The surface of the vertical cylinder can be weather proofed with flashing. Each T.C.S. further comprises a second 2" diameter horizontal steel cylinder attached to the top of the vertical cylinder at a 90° angle to the vertical cylinder. The wire rope is wrapped around the horizontal cylinder. The first end of the wire rope is fastened around the trunk of a tree and closed with a plurality of clamps. The second end of the wire rope passes through the horizontal cylinder attached to the top of each vertical cylinder and then through a washer where it is secured with one or more clamps.

The wire rope is connected with an amount of slack such that in a wind event the tree to which it is connected can move from a vertical position to a horizontal position. When the tree is in the horizontal position, the wire rope is held in position by the washer as it meets the horizontal cylinder. The wire rope can be sized to allow some slack in the line when the tree is in the horizontal position to allow for movement during the wind event.

Each T.C.S. can exist in a "primary" state and a "secondary" state. The primary state exists when the wire rope remains slack and is not pulled through the horizontal cylinder, and there is slack in the wire rope. The secondary state exists when the wire rope experiences tension and is pulled through the horizontal cylinder such that the washer meets with the end of the horizontal cylinder.

Three conditions are contemplated by the T.C.S. The first condition exists when the tree is in its vertical position. Each T.C.S. remains in its "primary" state.

The second and third conditions exist when the tree is in its horizontal state. In the second condition, direction of the wind is concentrated on one wire rope. That wire rope passes through the horizontal cylinder allowing the tree to descend to a horizontal position. The other 2 T.C.S.s remain in the primary state.

In the third condition, direction of the wind is concentrated on two wire ropes. The wire ropes pass through the horizontal cylinders allowing the tree to descend to a horizontal position. The other T.C.S. remains in the primary state.

Whether one or two cables exist in a secondary state, at least one T.C.S. remains in the primary state.

The T.C.S.s continue to hold the tree when it lies in its horizontal position, as the wire rope surrounding the tree trunk tightens when the wire rope becomes taught. Some slack in the wire rope remains allowing minor movements of the tree during minor wind events. This slack in the wire rope also allows dirt packed around the roots of the tree to resist some force as it would if planted at ground level. As the tree grows, the wire rope can be adjusted for a larger circumference.

FIGS. 1A-1F depict the various components of the tree cabling system.

Figure 1A:
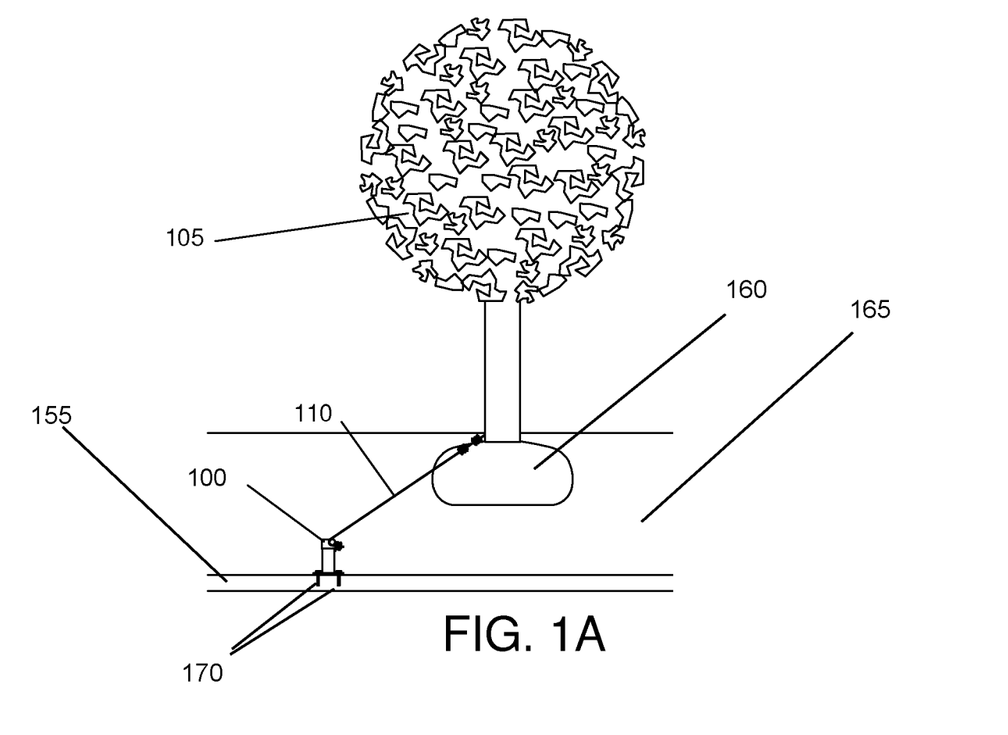
FIG. 1A is an elevation view of three T.C.S.s all in a primary state.
Figure 1B:
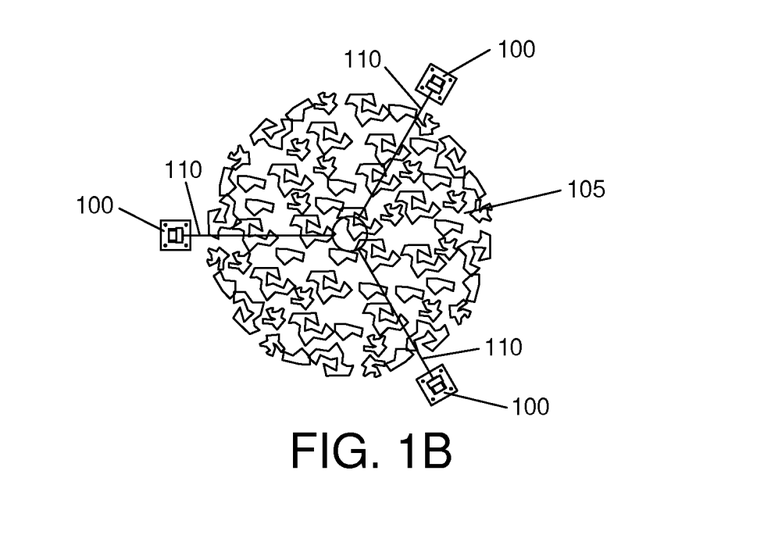
FIG. 1B is a plan view of FIG. 1A.

FIG. 1A is an elevation view of an exemplary T.C.S. 100 installed on a roof deck 155 typically made of poured concrete supporting a tree 105 and shown in a primary state having a root ball 160 located in soil 165. FIG. 1B is a plan view of FIG. 1A showing three T.C.S.s 100 supporting tree 105. As can be seen, three T.C.S.s 100 are used to support each tree 105, each T.C.S. 100 situated approximately 120° apart from each other.

Figure 1C:
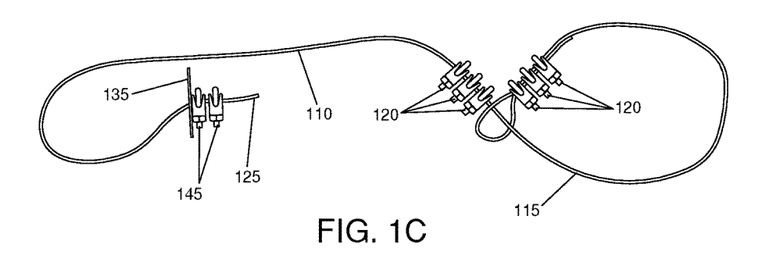
FIG. 1C depicts the wire rope used in each T.C.S.

FIG. 1C depicts wire rope 110 used in connection with each T.C.S. 100. One end 115 of each wire rope 110 is looped to form a noose which is secured by a plurality of clamps 120. End 115 of each wire rope 110 passes around the trunk of tree 105 to be supported. The other end 125 of each wire rope 110 passes through a horizontal cylinder 130 attached to the top of a vertical steel cylinder 140 which is anchored to a base 150 which is fastened to a roof deck 155 with 4 threaded rods 170. End 125 of wire rope 110 is attached around a washer 135 attached to horizontal cylinder 130 and is secured with a plurality of clamps 145, or end 125 may be welded to horizontal cylinder 130.

Figure 1D:
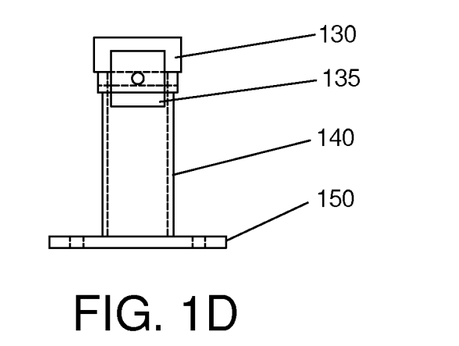
FIG. 1D is an end view of the vertical cylinder, base and horizontal cylinder.
Figure 1E:
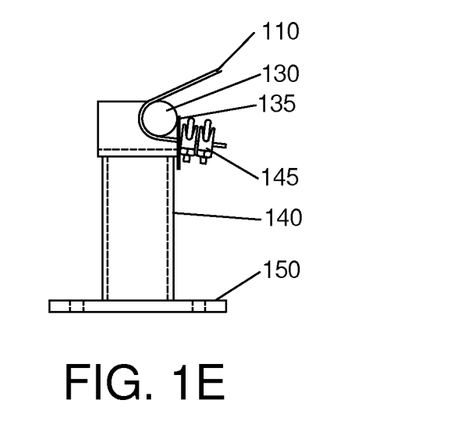
FIG. 1E is a front view of the vertical cylinder, base and horizontal cylinder.
Figure 1F:
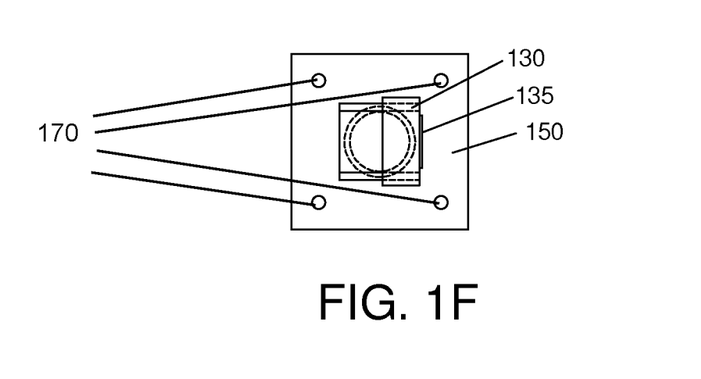
FIG. 1F is a top view of the vertical cylinder, base and horizontal cylinder.

FIG. 1D is an end view of vertical cylinder 140, a base 150 and horizontal cylinder 130. FIG. 1E is a front view of vertical cylinder 140, base 150 and horizontal cylinder 130 showing wire rope 110 attached to horizontal cylinder 130. FIG. 1F is a top view of vertical cylinder 140, base 150 and horizontal cylinder 130.

Figure 2A:
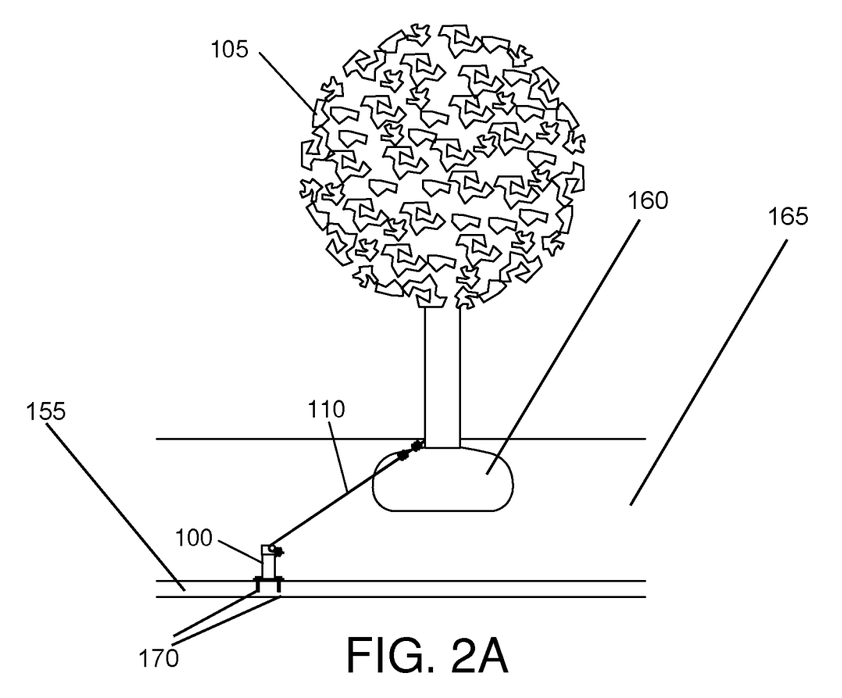
FIG. 2A is an elevation view of a first condition with three T.C.S.s all in a primary state, supporting a tree in its vertical position.

FIG. 2A is an elevation view of a first condition with three T.C.S.s 100 all in a primary state, supporting a tree 105 in its vertical position. FIG. 2D is a top view of FIG. 2A.

Figure 2B:
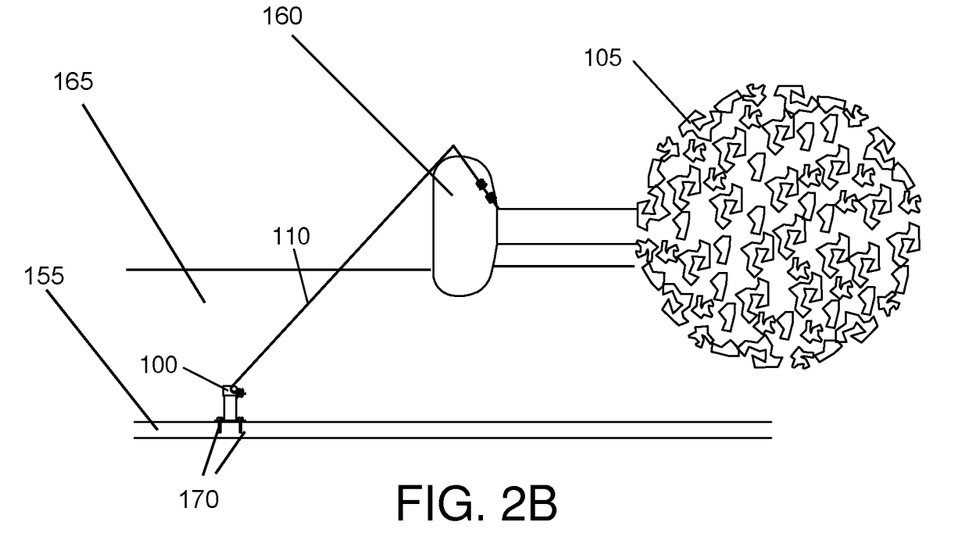
FIG. 2B is an elevation view of a second condition with two T.C.S.s in a primary state and a third T.C.S. in a secondary state.

FIG. 2B is an elevation view of a second condition with two T.C.S.s 100 in a primary state and a third T.C.S. 100 in a secondary state. FIG. 2E is a top view of FIG. 2B.

Figure 2C:
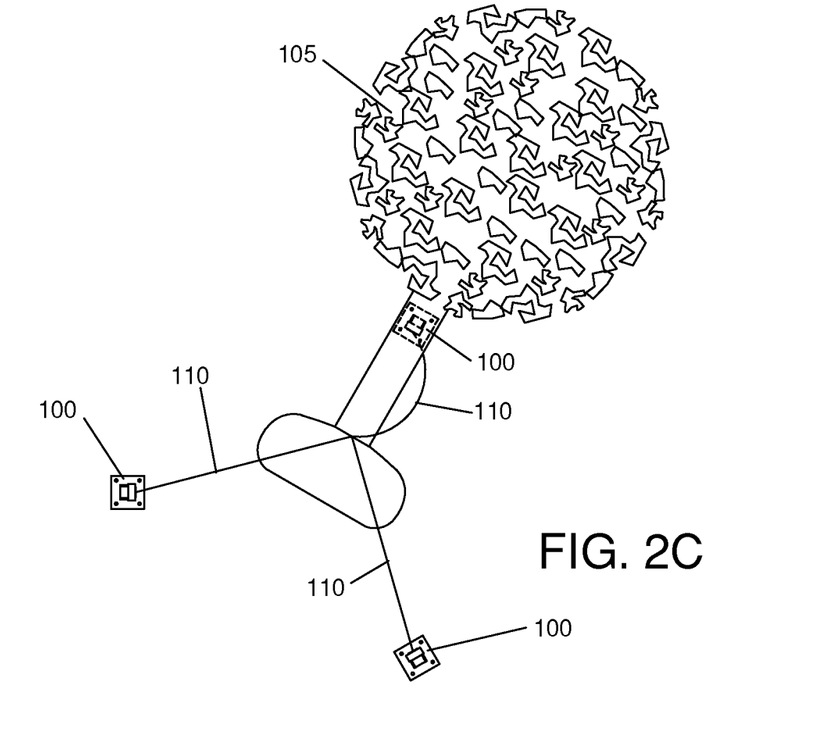
FIG. 2C is a top view of a third condition with one T.C.S. in a primary state and two T.C.S.s in a secondary state.
Figure 2D:
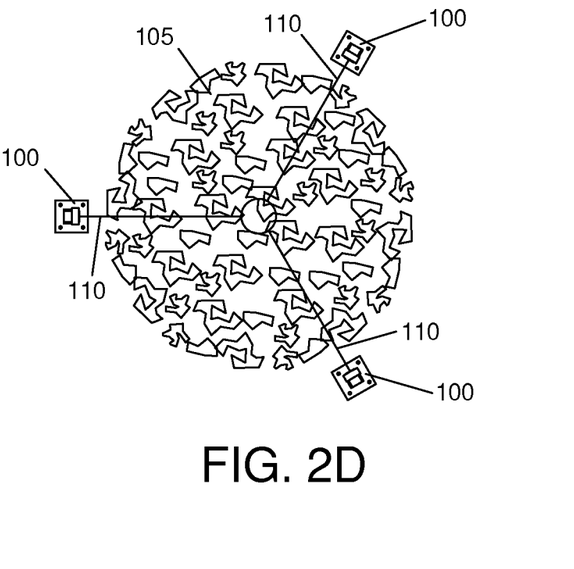
FIG. 2D is a top view of FIG. 2A.
Figure 2E:
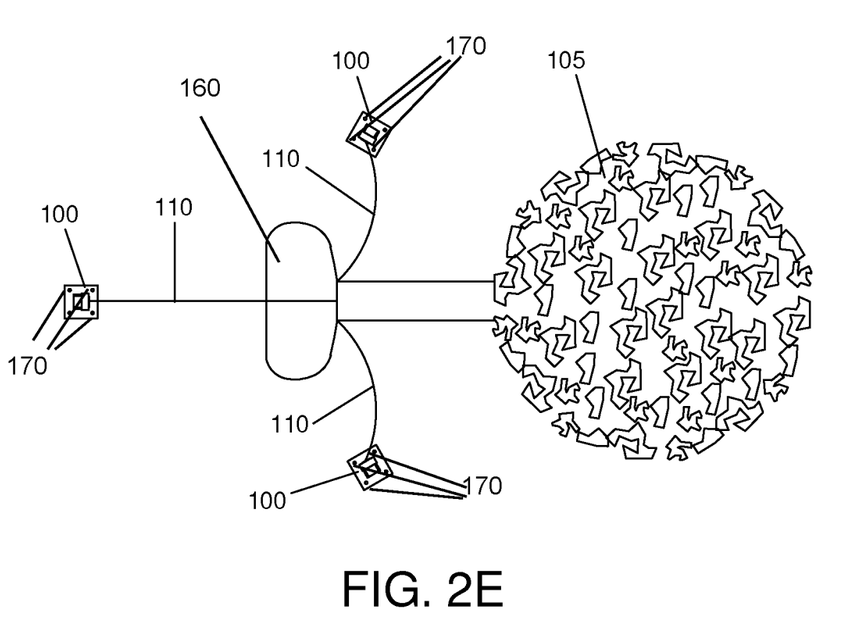
FIG. 2E is a top view of FIG. 2B.

FIG. 2C is a top view of a third condition with one T.C.S. 100 in a primary state and two T.C.S.s 100 in a secondary state.

EXAMPLES

The following examples are exemplary only based on engineering calculations based on a basic wind speed of 175 mph with a 300 ft. high roof deck, with Exposure D and building risk category of II, Open. Wind pressures have been calculated according to ASCE 7-10 (set out by the National Council of Structural Engineers Associations) and FBC (Florida Building Code) 2014. Uplift pressure has been calculated for three operational zones of design pressure of 101 PSF (Zone 1); 170 PSF (Zone 2); and 236 PSF (Zone 3) and the following assumptions:

| WIND CALCULATIONS WIND PRESS CALCULATED FROM ASCE 7-10 AND FBC 2014 ROOF CHARACTERISTICS: | |
|---|---|
| BASIC WIND SPEED | 175 mph |
| EXPOSURE | D |
| BUILDING RISK CATEGORY | II, OPEN |
| HEIGHT | 300 ft. |
| EDGE STRIP | (A) = VARIES |
| $K_h$: | 1.73 |
| $K_d$: | 0.95 |
| $K_{zt}$ | 1.0 |
| VEL. PRESSURE $Q_h$: | .00256 |
| $K_h$ $K_{zt}$ $K_d$ VEL. [squared] | 129 PSF |
| GCp: | EXTERNAL COEFFICIENT |
| ZONE 1 | −1.3 |
| ZONE 2 | 2.2 |
| ZONE 3 | 3.5 |
| GCpi: | INTERNAL COEFFICIENT +0.0 −0.0 |
| DESIGN PRESSURE: | $P = Q_h \times (GC_p - GC_{pi}) \times 0.6$ W |

-continued

WIND CALCULATIONS
WIND PRESS CALCULATED FROM ASCE 7-10 AND FBC 2014
ROOF CHARACTERISTICS:

| | |
|---|---|
| ZONE 1 | 129 × (−1.3) × 0.6 = 101 PSF |
| ZONE 2 | 129 × (−2.2) × 0.6 = 170 PSF |
| ZONE 3 | 129 × (−3.05) × 0.6 = 236 PSF |

Uplift Calculations Zone 1—Design Pressure 101 PSF
Area of 6 ft. diameter root ball=28.3 sq. ft.; 28.3 sq. ft.×101 PSF=2858 lbs. uplift
Tree dead weight=28.3 sq. ft.×2 ft.×100 PCF.=5660 lbs.
Only 60% of tree dead weight can be used to resist uplift: 0.6×5660=3396 LBS. 3396 lbs.>2858 lbs. uplift
Uplift Calculations Zone 2—Design Pressure 170 PSF
Area of 6 ft. diameter root ball=28.3 sq. ft.; 28.3 sq. ft.×170 PSF=4811 lbs. uplift
Tree dead weight=28.3 sq. ft.×2 ft.×100 PCF.=5660 LBS.
Only 60% of dead weight can be used to resist uplift. 0.6×5660=3396 lbs. 4811 lbs.−3396 lbs.=1415 lbs. deficit
Three cables are attached to tree to resist uplift; 1415 lbs./3=472 lbs. per cable.
Tension in cable:
Ft=tension in cable
Fv=vertical component of Ft=472 lbs;
Fh=horizontal component of ft. sin(theta)=Fv/Ft. Ft=Fv/sin(theta); tan(theta)=3'/4.5'; theta=34 degrees
Working strength of ½" cable=5320; breaking strength of ½" cable=5×5320 lbs.=26,600 lbs.
80% of working strength of ½" cable=0.8×5320 lbs.=4256 lbs.
Ft=Fv/sin 34 degrees; Ft=472/0.56=843 lbs.<80% of working strength of a ½" cable
T.C.S. comprising three (3) ½" cables will resist uplift in Zone 2, however lateral wind pressure will likely blow tree down during a hurricane. Two cables can resist the wind simultaneously, depending on the wind direction. While this is occurring, the remaining cable will always be unstressed (in compression).

The worst case scenario is a wind direction which concentrates on a single cable. See primary, secondary load conditions. Lateral pressure will blow tree down when the tension in a single cable exceeds 80% of the working strength. This is 4256 lbs for ½" cable. When this happens the clamps will slip allowing the tree to fall and the trunk to parallel the cable. wind against the root ball will create secondary tension in this cable. The other cable will be in primary state.

Cable tension in Zone 1: 28.3 sq. ft.×101 PSF=2858 lbs. A new angle is created between the anchor and the trunk once the tree is horizontal. tan(theta)=6'/5'-9" (see FIGS. 2A-2B), theta=46 degrees; Ft=Fh/cos 46; Ft=2858 lbs./0.69=4142 lbs. 4142 lbs.<4256 lbs.

Forces on anchor: there will be an uplift force and a horizontal force, which will create a moment.
Uplift force: Fv=Ft×sin 46; Fv=4142 lbs.×0.72=2982 lbs.
Moment: Fh×1 ft.=2858 ft. lbs.

A person skilled in the art can determine how to anchor the base and vertical cylinder to the roof deck to withstand the forces placed on the T.C.S. according to a particular configuration. As way of example only, and not meaning to be bound to a particular embodiment, FIG. 3 depicts an exemplary set of calculations on the installation of a suitable base and vertical cylinder on a concrete base for use in installation of the T.C.S. on a concrete roof deck. In this embodiment, a 10 inch square metal base plate of 0.6 inch thickness can be anchored to a 6 inch thick concrete base using four (4) stainless steel bolts meeting ASTM F593 with dimensions ⅝×4⁷⁄₁₀ using adhesive A7 available from Red-Head® Concrete Anchoring Systems available from ITW Construction Products of Canada. A 4 inch diameter Schedule 40 steel vertical cylinder is welded to the anchored base.

What is claimed is:

1. A tree anchoring system comprising a plurality of tree cabling systems fastened to a tree, wherein each tree cabling system comprises:
   a wire rope comprising a first end and a second end;
   an anchor; and
   a horizontal cylinder,
   wherein the anchor is fastened to a concrete roof deck in a vertical disposition,
   wherein the horizontal cylinder is attached to a top of the anchor at a 90° angle,
   wherein the first end of the wire rope is movably fastened to a trunk of a tree by encircling the tree trunk with the first end of the wire rope and fastening the first end of the wire rope to a portion of the wire rope more distal from the tree trunk with a plurality of first clamps to form a loop wherein the wire rope passes through the loop;
   wherein the second end of the wire rope is movably attached to pass through the horizontal cylinder that is attached to the anchor, wherein the wire rope passes through a washer on the side of the horizontal cylinder that is distal from the tree trunk, wherein a plurality of second clamps are attached substantially to the second end of the wire rope, wherein the plurality of second clamps are sized larger than a central hole in the washer,
   wherein a plurality of third clamps are attached to the wire rope in a section of the wire rope between the horizontal cylinder and the second end of the wire rope and to the second end of the wire rope,
   wherein when the plurality of tree cabling systems are disposed around a circumference of the tree such that when the tree is in a vertical position, each wire rope comprises slack at the second end of the wire rope that is distal from the tree trunk and the horizontal cylinder,
   wherein when the tree experiences a wind event and bends from the vertical position such that it creates a tension in any of the wire ropes, the second end of any wire rope experiencing tension that is approximately 80% of its working strength passes through the third plurality of clamps and the tension pulls the second end of the wire rope through the horizontal cylinder until the washer meets the end of the horizontal cylinder that is distal from the tree trunk, whereupon the tree descends to a horizontal position and each wire rope remains attached to the trunk of the tree.

2. The tree anchoring system of claim 1, comprising three tree cabling systems for the tree.

3. The tree anchoring system of claim 2, wherein each tree cabling system is anchored to the concrete roof deck approximately 120° apart from each other around the tree to which the tree cabling system is attached.

4. The tree anchoring system of claim 2, wherein the anchor is fastened to the concrete roof deck with 4 threaded rods secured by epoxy.

5. The tree anchoring system of claim 4, wherein the anchor comprises a vertical 4" diameter steel cylinder welded to a base.

6. A method of anchoring a tree to a roof deck, comprising:
- anchoring a tree to a deck with a plurality of the tree cabling systems of claim 1,
- wherein each tree cabling system comprises a primary state and a secondary state,
- wherein the primary state comprises a condition where there is slack in the wire rope,
- wherein the secondary state comprises a condition where the wire rope experiences tension,
- wherein each tree cabling system comprises the primary state when the tree is in a vertical position,
- wherein one or more but not all of the tree cabling system comprise the secondary state when the tree is in a horizontal position.

7. The method of claim 6, comprising three tree cabling systems attached to the tree.

8. The method of claim 7, wherein each tree cabling system is anchored to the roof deck approximately 120° apart from each other around the tree to which the tree cabling system is attached.

9. The method of claim 6, wherein the anchor is fastened to the concrete roof deck with 4 threaded rods secured by epoxy.

10. The method of claim 9, wherein the anchor comprises a vertical 4" diameter steel cylinder welded to a base.

\* \* \* \* \*